(12) United States Patent  
Stauner et al.

(10) Patent No.: US 9,135,217 B2  
(45) Date of Patent: Sep. 15, 2015

(54) METHOD AND DEVICE FOR OPERATING A MOTOR VEHICLE

(71) Applicant: Bayerische Motoren Werke Aktigensellschaft, Munich (DE)

(72) Inventors: Thomas Stauner, Unterschleissheim (DE); Roman Nagy, Unterhaching (DE); Joachim Froeschl, Herrsching (DE); Martin Hattenkofer, Moosthenning (DE); Christoph Wanke, Mering (DE)

(73) Assignee: Bayerische Motoren Werke Aktiengesellscahft, Munich (DE)

( * ) Notice: Subject to any disclaimer, the term of this patent is extended or adjusted under 35 U.S.C. 154(b) by 274 days.

(21) Appl. No.: 13/680,872

(22) Filed: Nov. 19, 2012

(65) Prior Publication Data

US 2013/0076501 A1 Mar. 28, 2013

Related U.S. Application Data

(63) Continuation of application No. PCT/EP2011/057967, filed on May 17, 2011.

(30) Foreign Application Priority Data

May 19, 2010 (DE) .................. 10 2010 029 115

(51) Int. Cl.
*G06F 17/00* (2006.01)
*B60R 16/03* (2006.01)
*H02J 1/14* (2006.01)
*B60Q 1/00* (2006.01)

(52) U.S. Cl.
CPC ...... *G06F 17/00* (2013.01); *B60Q 1/00* (2013.01); *B60R 16/03* (2013.01); *H02J 1/14* (2013.01); *Y02T 10/92* (2013.01)

(58) Field of Classification Search
CPC .......... G06F 17/00; B60Q 1/00; B60R 16/00; H02J 1/00; Y02T 10/00
USPC .................... 701/58, 123, 424, 490, 538
See application file for complete search history.

(56) References Cited

U.S. PATENT DOCUMENTS 6,292,741 B1   9/2001 Bitzer et al.
6,718,214 B1 * 4/2004 Schoettle et al. ............... 700/28
(Continued)

FOREIGN PATENT DOCUMENTS

DE   39 36 638 C1   3/1991
DE   198 38 333 A1   3/2000
(Continued)

OTHER PUBLICATIONS

International Preliminary Report on Patentability (PCT/IB/373) dated Nov. 20, 2012 (one (1) page).
(Continued)

*Primary Examiner* — John R Olszewski
*Assistant Examiner* — Truc M Do
(74) *Attorney, Agent, or Firm* — Crowell & Moring LLP

(57) ABSTRACT

At least one weighting value is determined in a manner that is influenced by a vehicle user. A maximum released power, which a predefined electrical consumer of the motor vehicle may consume, is determined as a function of the weighting value. The power consumption of the electrical consumer is controlled as a function of the maximum power that is released.

16 Claims, 2 Drawing Sheets

(56) References Cited

U.S. PATENT DOCUMENTS

| | | | |
|---|---|---|---|
| 7,546,189 B2 | 6/2009 | Dittrich | |
| 8,271,156 B2 | 9/2012 | Jinno et al. | |
| 2003/0173126 A1* | 9/2003 | Gosselin | 180/65.3 |
| 2004/0020695 A1* | 2/2004 | Potter | 180/65.1 |
| 2004/0159477 A1* | 8/2004 | Ishikawa et al. | 180/65.1 |
| 2004/0232769 A1* | 11/2004 | Pickering | 307/10.1 |
| 2008/0272717 A1* | 11/2008 | Gleason et al. | 318/139 |
| 2008/0293541 A1* | 11/2008 | Kanafani et al. | 477/110 |
| 2008/0305923 A1* | 12/2008 | Tabata et al. | 477/3 |
| 2009/0259354 A1* | 10/2009 | Krupadanam et al. | 701/22 |
| 2009/0319107 A1* | 12/2009 | Soma | 701/22 |
| 2011/0010031 A1* | 1/2011 | Syed et al. | 701/22 |
| 2011/0060517 A1* | 3/2011 | Kono et al. | 701/123 |
| 2011/0093151 A1* | 4/2011 | Kojima et al. | 701/22 |
| 2011/0118930 A1* | 5/2011 | Hauptmann et al. | 701/29 |
| 2011/0166732 A1* | 7/2011 | Yu et al. | 701/22 |
| 2011/0172864 A1* | 7/2011 | Syed et al. | 701/22 |
| 2011/0276206 A1* | 11/2011 | Tofukuji et al. | 701/22 |
| 2011/0309838 A1* | 12/2011 | Lin et al. | 324/427 |
| 2012/0065837 A1* | 3/2012 | Noack et al. | 701/34.4 |
| 2012/0245775 A1* | 9/2012 | Syed et al. | 701/22 |

FOREIGN PATENT DOCUMENTS

| | | |
|---|---|---|
| DE | 199 60 079 A1 | 6/2000 |
| DE | 102 11 970 A1 | 10/2003 |
| DE | 10 2005 016 914 A1 | 10/2006 |
| DE | 10 2007 037 329 A1 | 2/2008 |
| DE | 11 2007 003 261 T5 | 1/2010 |
| EP | 1 103 426 A1 | 5/2001 |
| GB | 2 360 644 A | 9/2001 |
| JP | 2006-182198 A | 7/2006 |

OTHER PUBLICATIONS

Written Opinion (PCT/ISA/237) dated Aug. 12, 2011 (six (6) pages).
International Search Report dated Aug. 12, 2011 with English translation (four (4) pages).
German Search Report dated Feb. 17, 2011 with partial English translation (nine (9) pages).

* cited by examiner

METHOD AND DEVICE FOR OPERATING A MOTOR VEHICLE

CROSS REFERENCE TO RELATED APPLICATIONS

This application is a continuation of PCT International Application No. PCT/EP2011/057967, filed May 17, 2011, which claims priority under 35 U.S.C. §119 from German Patent Application No. DE 10 2010 029 115.3, filed May 19, 2010, the entire disclosures of which are herein expressly incorporated by reference.

BACKGROUND AND SUMMARY OF THE INVENTION

The invention relates to a method and a device for operating a motor vehicle, wherein with the method and/or the device, respectively, the power consumption of an electrical consumer of the motor vehicle is controlled.

Owing to the growing awareness of the environment, a lower energy consumption is becoming more and more important to users of motor vehicles. Hence, one important aspect is an efficient energy usage.

DE 102 11 970 A1 discloses a method for adjusting the power demand of a plurality of electrical consumers (loads) in the electrical distribution systems of motor vehicles. In order to control the power consumption of a plurality of consumers, each of these consumers is constantly provided with information about the total electrical power that is available at any given time.

Hence, the object of the present invention is to provide a method and a device for operating a motor vehicle, wherein the method and/or the device, respectively, support an efficient use of energy.

This and other objects are achieved by a method and a corresponding device for operating a motor vehicle, in which at least one weighting value is determined in a manner that is influenced by a vehicle user. A maximum released power, which a predefined electrical consumer of the motor vehicle may consume, is determined as a function of the weighting value. The power consumption of the electrical consumer is controlled as a function of the maximum power that is released.

This strategy makes it possible for a vehicle user to influence the power consumption of one or more electrical consumers; and at the same time, in particular, the needs of the vehicle user can be taken into consideration. This feature can contribute in an advantageous way to the goal of a more efficient use of the energy in the motor vehicle.

The vehicle user can influence specific properties of the motor vehicle by use of the weighting value. The weighting value can be, for example, representative of a comfort property of the motor vehicle, a high performance driving style and/or a cruising range of the motor vehicle. Given a predefined set of electrical consumers of the motor vehicle, a specific consumer can be classified, as a function of the weighting value(s), as more or less important in its significance to the vehicle user. A small weighting value, which is representative of, for example, the comfort property of the motor vehicle, has, for example, the result that, for example, less power is made available to the seat heating system and/or an air conditioning system, as compared to a case, in which the weighting value has a higher value.

The power consumption of the electrical consumer can be controlled by way of a control unit, which is disposed in the motor vehicle and which controls the power consumption of each consumer in such a way that the power consumed by the electrical consumer does not exceed the determined maximum power that is released to the consumer for its consumption. As an alternative or in addition, it is possible that the electrical consumer is designed to set its power consumption, as a function of the maximum power that is released for the electrical consumer.

According to one advantageous embodiment, the weighting value is determined as a function of an input of the vehicle user. This arrangement has the advantage that those needs that are specific to the vehicle user can be taken into consideration. An input can be performed by way of an input unit that is configured in such a way that it lends itself, for example, to use with a keypad, which is arranged in the vehicle; and/or an input can be performed by use of a sensor screen. It is possible, for example, to enter a numerical value from a predefined range of values by use of a keypad for the respective weighting value; and/or, for example, values are predefined by touching the sensor screen. For example, a predefined position of the sensor screen is assigned a vector of weighting values; and the dimension of the vector is equal to a predefined number of weighting values. It is also possible that one or more predefined standard weighting(s) is or are proposed to the vehicle user; and that the vehicle driver selects one of the proposed standard weightings.

According to another advantageous embodiment, the weighting value is determined, as a function of at least one operating variable, by way of a performance monitor. The operating variable can be representative of a measured variable that is collected; and/or the operating variable can be representative of a derived variable. The operating variable can be, for example, representative of a user profile of at least one electrical consumer; and this user profile is specific to a vehicle user; and/or the operating variable can be representative of a driving style of a vehicle driver. This feature constitutes an advantageous approach that enables the needs of a vehicle user to be considered in an indirect way in the course of determining the weighting value(s).

According to an additional advantageous embodiment, an allocation value for the electrical consumer is determined as a function of the weighting value; and the maximum released power, which the consumer may consume, is determined as a function of the allocation value. This feature makes it possible to determine in a simple way the maximum power that is released; and this feature also makes it possible to control in a simple way the power consumption of the electrical consumer. The allocation value can represent a fixed percentage, so that, for example, a fixed percentage of 60%, of the electrical consumer's maximum power or nominal power, desired power is made available to the electrical consumer as the maximum power released for it.

According to another advantageous embodiment, a functional variable is determined as a function of the weighting value; and the maximum released power, which the electrical consumer may consume, is determined as a function of the predefined allocation function and the determined functional variable for the electrical consumer.

According to an additional advantageous embodiment, the maximum released power is determined as a function of the total electric energy that is available for the predefined electrical consumers of the motor vehicle.

According to another advantageous embodiment, the functional variable is representative of a sum of a normalized functional variable and a setting value, wherein the setting value is determined as a function of the weighting value.

According to an additional advantageous embodiment, the functional variable is representative of the product of a normalized functional variable and a setting value.

According to an additional advantageous embodiment, the allocation function is represented by the following equation:

$$f(x)=1-(1-x)^z$$

where
x: normalized energy availability
f(x): normalized maximum power that is released
z: functional variable The allocation function makes it possible to consider both an energy availability and also the weighting value in the course of determining the maximum power that is released for an electrical consumer.

According to another advantageous embodiment, the maximum released power, which the electrical consumer of the motor vehicle may consume, is optimized in consideration of at least one quality function and as a function of the weighting value; and the power consumption of the electrical consumer is controlled as a function of the optimized maximum power that is released.

According to an additional advantageous embodiment, the limited functionality of the electrical consumer is determined and signaled by use of visual cues, auditory cues and/or tactile cues. In addition or as an alternative, it is also possible to determine and signal the limited functionality of an electrical system; and this electrical system, to which a plurality of electrical consumers are assigned, may be, for example, a steering system. The limited functionality of the electrical consumer can be signaled by way of an output unit that is designed to lend itself, for example, as a display such as an LED display. This arrangement allows the vehicle user to obtain in an advantageous way information as to which electrical consumer and/or which electrical system is or are capable of functioning now only to a limited extent.

According to another advantageous embodiment, an additional and/or reduced energy consumption is determined in comparison to an energy consumption, when the maximum released power, which the electrical consumer of the motor vehicle may consume, is determined as a function of at least one predefined target weighting value. The additional and/or reduced energy consumption is signaled by use of visual cues and/or auditory cues. This strategy allows the vehicle user to obtain in an advantageous way information about the energy consumption, as a function of one or more specific weighting value(s), and to use this information to make a decision about whether he would like to maintain the specific weighting value(s). The additional and/or reduced energy consumption can be signaled by use of an output unit that is designed to lend itself, for example, as a display such as an LED display.

According to an additional advantageous embodiment, the input is performed via an input unit, which has a control panel that is designed as a sensor screen and that has a geometric shape with a plurality of corners, wherein a number of corners is equal to a number of weighting values. This arrangement supports an intuitive input in an advantageous way. In the case that the aim is to perform an input for less than three weighting values, the control panel can be configured in a manner analogous to a bar graph.

Other objects, advantages and novel features of the present invention will become apparent from the following detailed description of one or more preferred embodiments when considered in conjunction with the accompanying drawings.

DETAILED DESCRIPTION OF THE DRAWINGS

The device for operating a motor vehicle has, for example, an input unit, a computer unit and an output unit.

Figure 1:
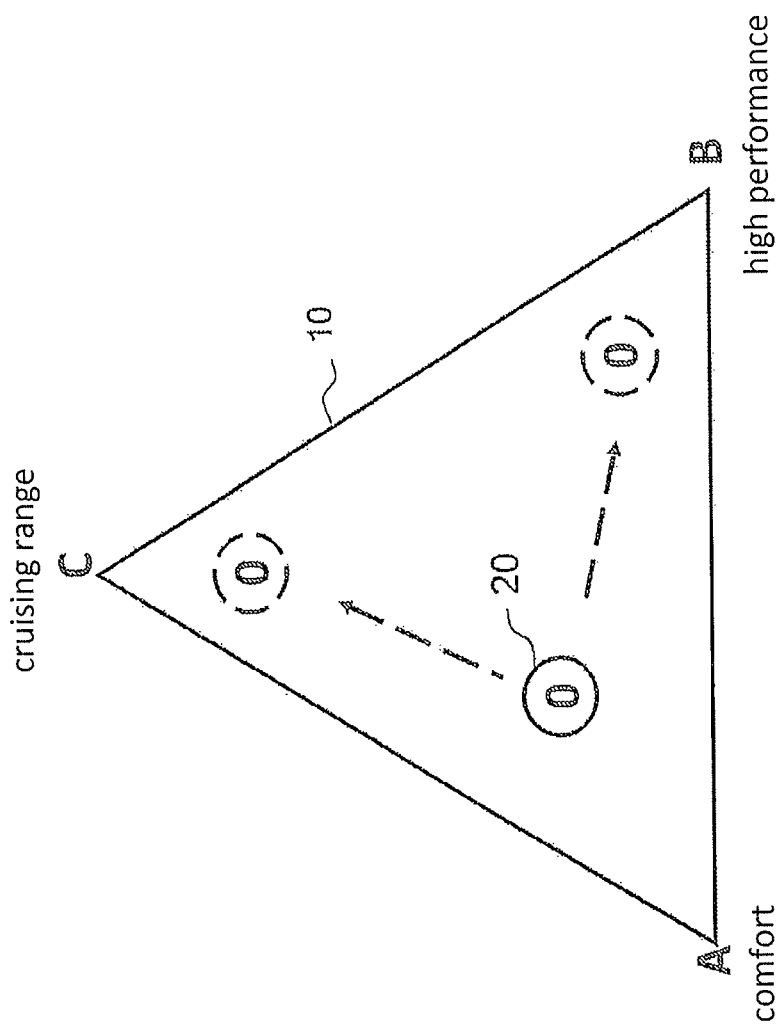
FIG. 1 shows an exemplary embodiment of a control panel 10 of an input unit.

The input unit has, for example, a control panel 10, which is designed as a sensor screen. An input by the vehicle user is performed, for example, by touching the sensor screen at a desired position and/or by moving a marked field 20 into the desired position. The control panel 10 has a geometric shape with many corners, where a number of corners is equal to a number of weighting values. The corners are arranged in such a way that they are uniformly distributed about 360 degrees, for example, in the shape of a circle. The control panel 10, shown in FIG. 1, has three corners. As an alternative, it is also possible that the control panel 10 has four or more corners. Each corner of the control panel 10 is assigned a property of the motor vehicle. For example, a first corner A is assigned a comfort property; a second corner B is assigned a high performance driving style; and a third corner C is assigned a cruising range of the motor vehicle. Each position of the control panel 10 is assigned, for example, a vector of the weighting values. In this case, the number of weighting values is equal to three. For example, a first weighting value is representative of the comfort property; a second weighting value is representative of the high performance driving style; and a third weighting value is representative of the cruising range. For example, the first weighting value, which is representative of the comfort property, can be determined as a function of the distance of a touch position from the first corner A, which is assigned the comfort property.

As an alternative or in addition, an input can be performed by use of a keypad, wherein, for example, a numerical value from a predefined range of values is entered for the respective weighting value.

Instead of the input unit (or in addition to the input unit), the device for operating the motor vehicle can have a performance monitor, which is designed to determine the weighting value, as a function of at least one operating variable.

The computer unit can be designed, for example, to determine the maximum released power, which a predefined electrical consumer (load) of the motor vehicle may consume, as a function of the weighting value, which is determined as a function of an input of the vehicle user and/or by way of the performance monitor. For example, the computer unit can be designed to determine a functional variable z, as a function of the weighting value(s); and the computer unit can be designed to determine the maximum released power, which the electrical consumer may consume, as a function of a predefined allocation function f_x and the determined functional variable z for the electrical consumer.

Figure 2:
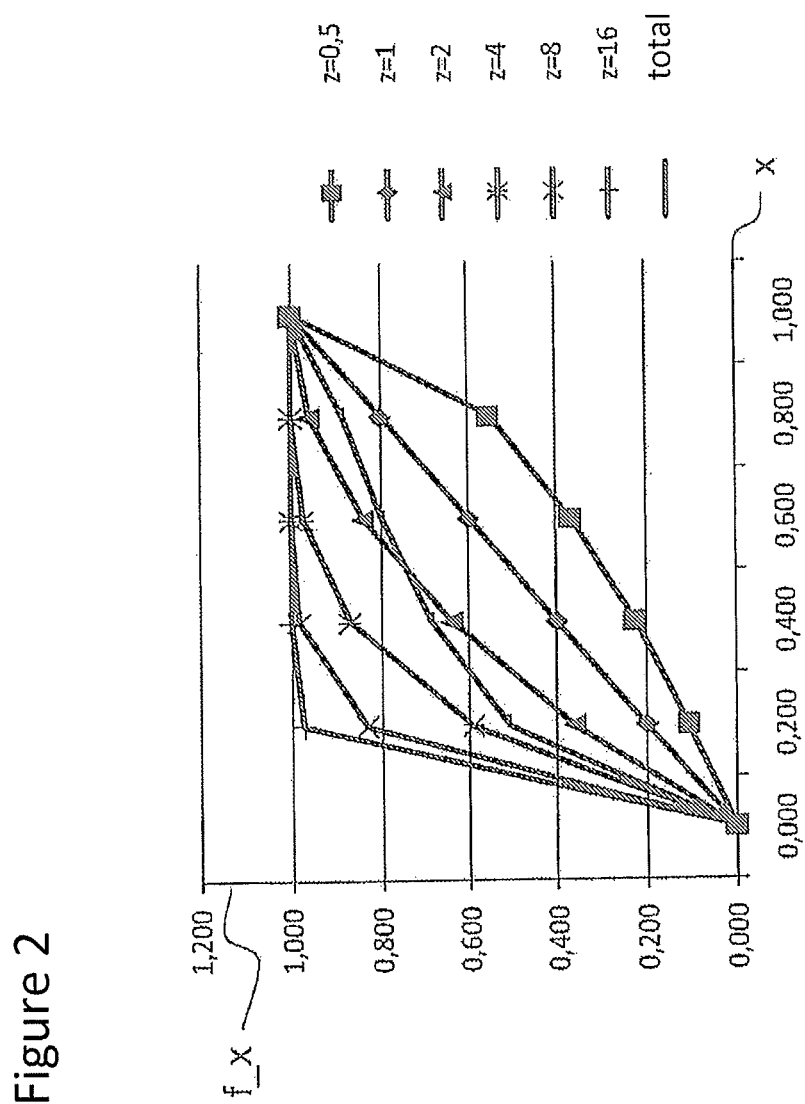
FIG. 2 shows a graph of an allocation function f_x for different values of a functional variable z.

The allocation function f_x can be represented, for example, by the following equation:

$$f(x)=1-(1-x)^z$$

where
x: normalized energy availability
f(x): normalized maximum power that is released
z: functional variable FIG. 2 shows several curves of the allocation function f_x as a function of the functional variable z, which is determined, for example, for a predefined electrical consumer.

A first curve of the allocation function f_x represents, for example, a first curve of the normalized maximum power that is released for a first electrical consumer with a specific functional variable z, for example z=0.5, as a function of a normalized energy availability x. The functional variable z influences the curve of the allocation function f_x. For small values of the functional variable z, for example z<1, the normalized maximum power released for the electrical consumer declines to a much greater extent than in the case of a large value for the functional variable z, for example, z>10, when the available amount of energy is reduced.

As an alternative, it is possible, for example, that the computer unit is designed, for example, to determine an allocation value for the electrical consumer, as a function of the weighting value(s); and the computer unit is designed to determine the maximum released power, which the consumer may consume, as a function of the allocation value. An additional alternative is, for example, that the computer unit is designed to optimize the maximum released power, which the electrical consumer of the motor vehicle may consume, in consideration of at least one quality function and as a function of the weighting value(s); and the computer unit is designed to control the power consumption of the electrical consumer, as a function of the optimized maximum power that is released.

The computer unit can be designed to determine the limited functionality of the electrical consumer and/or to determine an additional and/or a reduced energy consumption in comparison to an energy consumption, when the maximum released power, which the electrical consumer of the motor vehicle may consume, is determined as a function of at least one predefined target weighting value. The determined limited functionality of the electrical consumer and/or of an electrical system can be signaled, for example, by way of the output unit; and/or the additional and/or reduced energy consumption can be signaled, for example, by way of the output unit. The output unit can be designed to lend itself, for example, as a display such as an LED display. For the display, it is possible to use, for example, at least one bar graph and/or fan graph. A color display of the bar graph and/or the fan graph can be selected, for example, in such a way that a vehicle user can recognize by the color or colors whether it involves an information signal or a warning signal.

In addition or as an alternative, it is also possible, for example, to show the current maximum cruising range of the motor vehicle and/or the driving power of an engine.

The power consumption of the respective electrical consumer can be controlled, for example, in such a way that the respective electrical consumer is designed to set its power consumption as a function of the maximum power released for the electrical consumer.

LIST OF REFERENCE NUMERALS AND SYMBOLS

10 control panel
20 marked field
A first corner (comfort)
B second corner (high performance)
C third corner (cruising range)
f_x allocation function
x normalized energy availability
z functional variable The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle by a computer unit of the motor vehicle, the method comprising the acts of:
    determining, by the computer unit, at least one weighting value in a manner influenced by a vehicle user;
    determining, by the computer unit, an allocation value for a predefined electrical consumer of the motor vehicle as a function of the weighting value;
    determining, by the computer unit, a maximum released power, which the predefined electrical consumer of the motor vehicle may consume, as a function of the allocation value; and
    controlling, by the computer unit, a power consumption of the electrical consumer as a function of the maximum power that is released.

2. The method according to claim 1, further comprising the act of determining, by the computer unit, the weighting value as a function of an input of the vehicle user.

3. The method according to claim 1, further comprising the act of determining, via a performance monitor, the weighting value as a function of at least one operating variable of the motor vehicle.

4. A method of operating a motor vehicle by a computer unit of the motor vehicle, the method comprising the acts of:
    determining, by the computer unit, at least one weighting value in a manner influenced by a vehicle user;
    determining, by the computer unit, a functional variable for a predefined electrical consumer of the motor vehicle as a function of the weighting value;
    determining, by the computer unit, a maximum released power, which the electrical consumer may consume, as a function of a predefined allocation function and the determined functional variable for the electrical consumer; and
    controlling, by the computer unit, a power consumption of the electrical consumer as a function of the maximum released power.

5. The method according to claim 4, further comprising the act of:
    determining, by the computer unit, the maximum released power as a function of a total electric energy available for predefined electrical consumers of the motor vehicle.

6. The method according to claim 4, wherein
    the functional variable is representative of a sum of a normalized functional variable and a setting value, the setting value being determined as a function of the weighting value.

7. The method according to claim 5, wherein
    the functional variable is representative of a sum of a normalized functional variable and a setting value, the setting value being determined as a function of the weighting value.

8. The method according to claim 4, wherein
    the functional variable is representative of a product of a normalized functional variable and a setting value, the setting value being determined as a function of the weighting value.

9. The method according to claim 5, wherein
    the functional variable is representative of a product of a normalized functional variable and a setting value, the setting value being determined as a function of the weighting value.

10. The method according to claim 4, wherein the predefined allocation function is represented by the following equation:

$$f(x)=1-(1-x)z$$

where
x: normalized energy availability
f(x): normalized maximum power that is released
z: functional variable.

11. The method according to claim 1, further comprising the acts of:
optimizing, by the computer unit, the maximum released power, which the electrical consumer of the motor vehicle may consume, based on at least one quality function and as a function of the weighting value; and
controlling, by the computer unit, power consumption of the electrical consumer as a function of the optimized maximum released power.

12. The method according to claim 1, further comprising the acts of:
determining, by the computer unit, a limited functionality of the electrical consumer; and
signaling, by the computer unit, the determined limited functionality via at least one of a visual cue, an auditory cue, and a tactile cue.

13. The method according to claim 1, further comprising the acts of:
determining, by the computer unit, at least one of an additional and reduced energy consumption in comparison to an energy consumption when the maximum released power, which the electrical consumer of the motor vehicle may consume, is determined as a function of at least one predefined target weighting value; and
signaling, by the computer unit, the at least one of the additional and reduced energy consumption by one of a visual cue and an auditory cue.

14. A device for operating a motor vehicle, comprising:
a computer unit of the motor vehicle, the computer unit comprising:
a weighting value determining unit that determines at least one weighting value in a manner influenced by a vehicle user,
a maximum released power determining unit that determines a maximum released power, which a predefined electrical consumer of the motor vehicle may consume, as a function of the at least one weighting value, and
a power consumption control unit that controls power consumption of the electrical consumer as a function of the maximum released power; and
an input unit operatively coupled with the computer unit, the input unit comprising a control panel operatively configured as a sensor screen providing a geometric shape having a plurality of corners, wherein a number of corners of the geometric shape is equal to a number of weighting values.

15. A method of operating a motor vehicle by a computer unit of the motor vehicle, the method comprising the acts of:
determining, by the computer unit, at least one weighting value in a manner influenced by a vehicle user;
determining, by the computer unit, a maximum released power, which a predefined electrical consumer of the motor vehicle may consume, as a function of the weighting value;
controlling, by the computer unit, a power consumption of the electrical consumer as a function of the maximum released power; and
displaying, on a sensor screen of a control panel operatively coupled with the computer unit, a geometric shape having a plurality of corners, wherein a number of corners of the geometric shape is equal to a number of weighting values.

16. A device for operating a motor vehicle, comprising:
a computer unit of the motor vehicle, the computer unit comprising:
a weighting value determining unit that determines at least one weighting value in a manner influenced by a vehicle user,
a functional variable determining unit that determines a functional variable as a function of the weighting value,
a maximum released power determining unit that determines a maximum released power, which a predefined electrical consumer of the motor vehicle may consume, as a function of a predefined allocation function and the determined functional variable for the electrical consumer, and
a power consumption control unit that controls power consumption of the electrical consumer as a function of the maximum released power.

* * * * *